Jan. 18, 1949. A. W. MALL 2,459,233
SAW SHARPENER
Filed Sept. 28, 1944 4 Sheets-Sheet 1
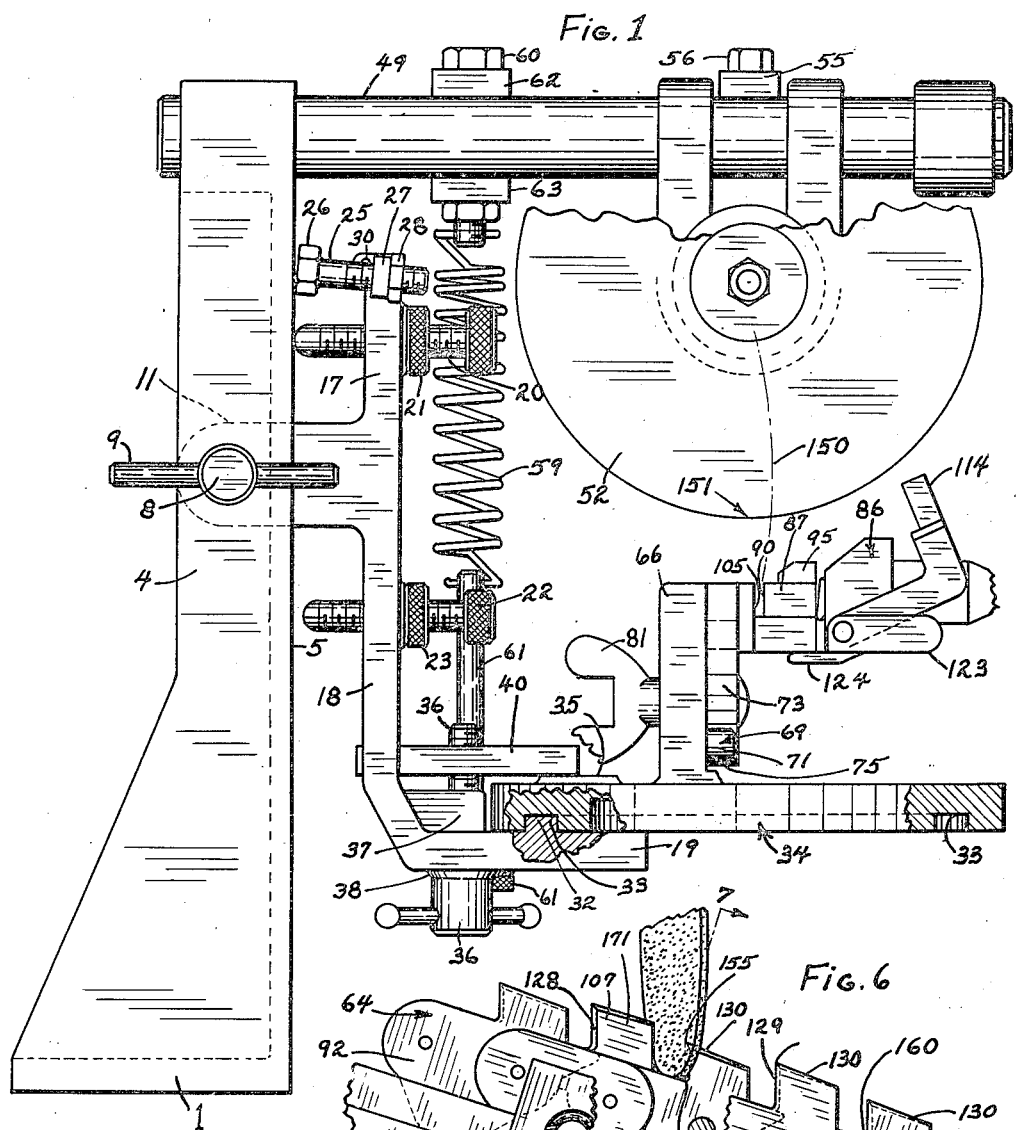
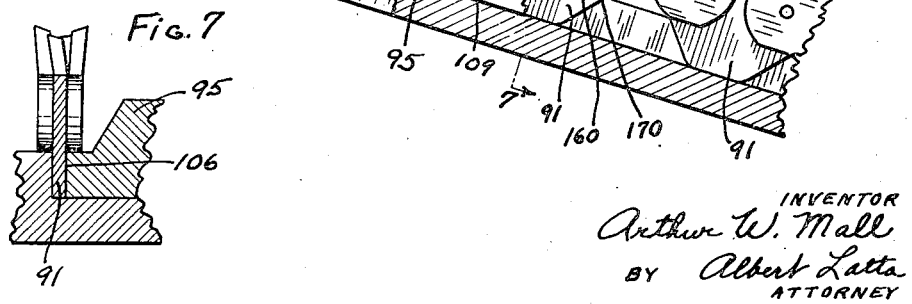
INVENTOR
Arthur W. Mall
BY Albert Latta
ATTORNEY

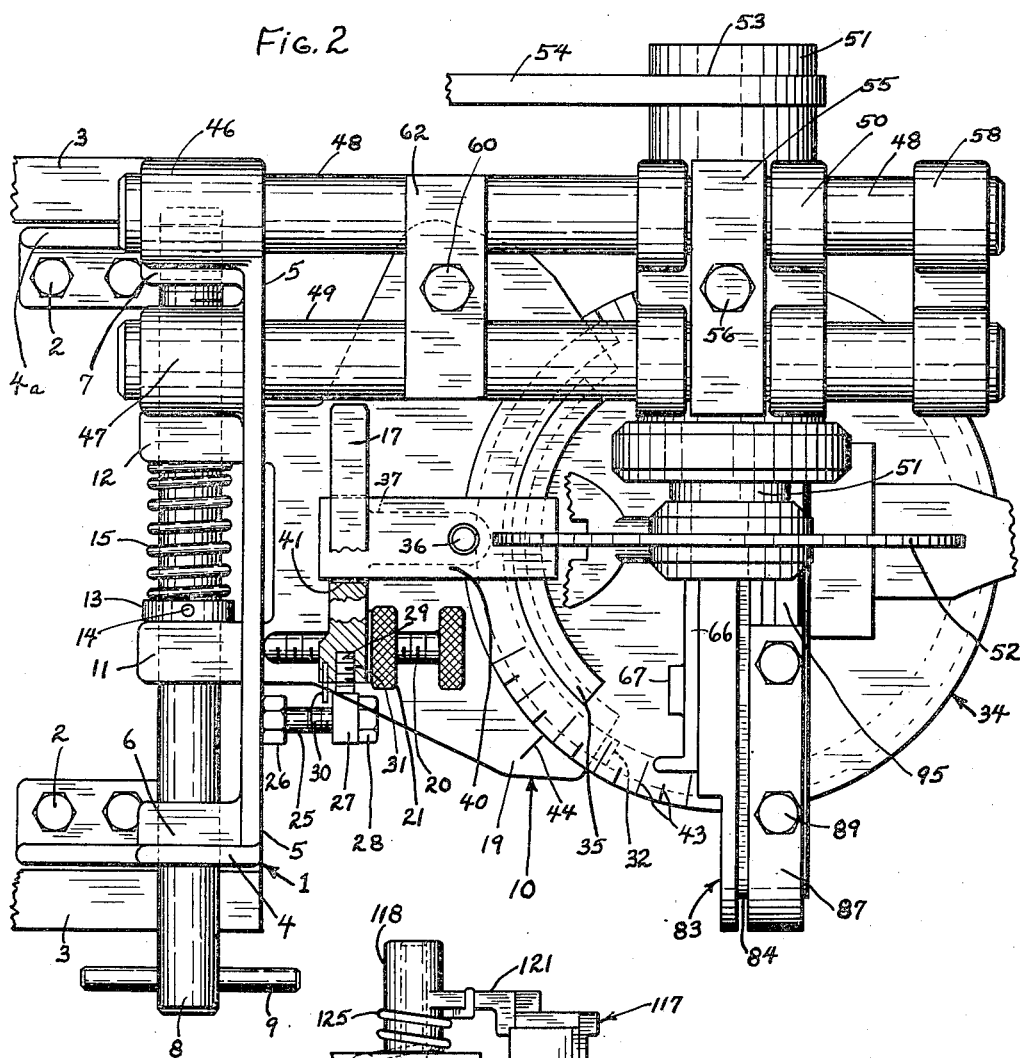
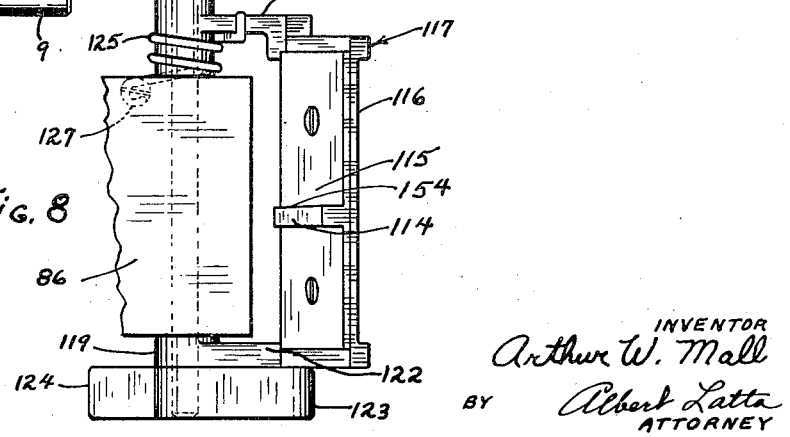

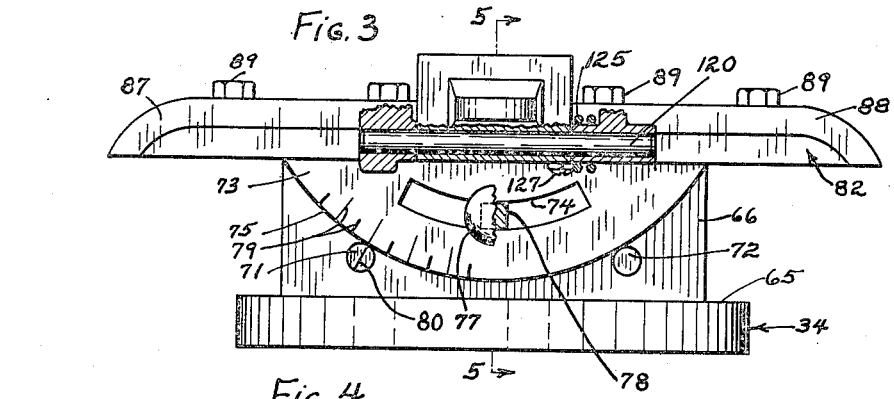
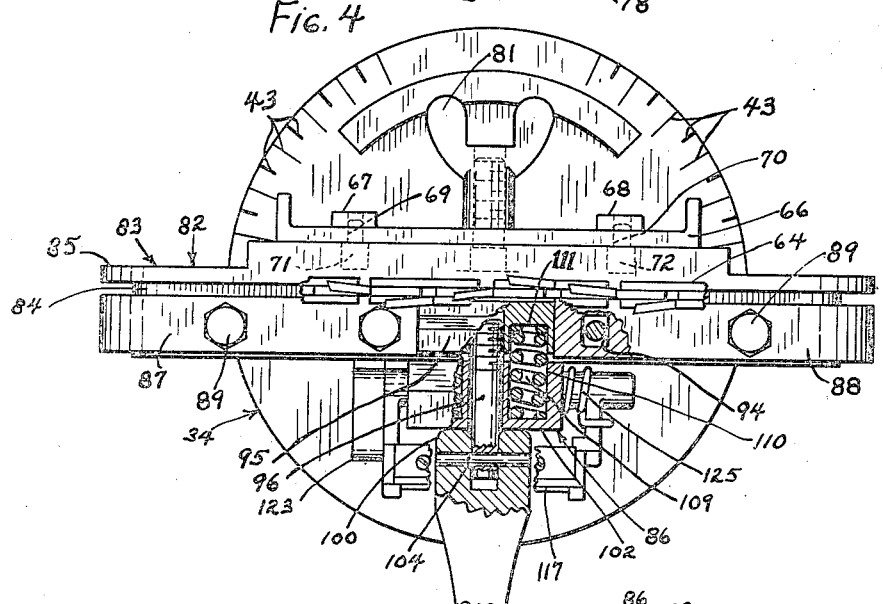
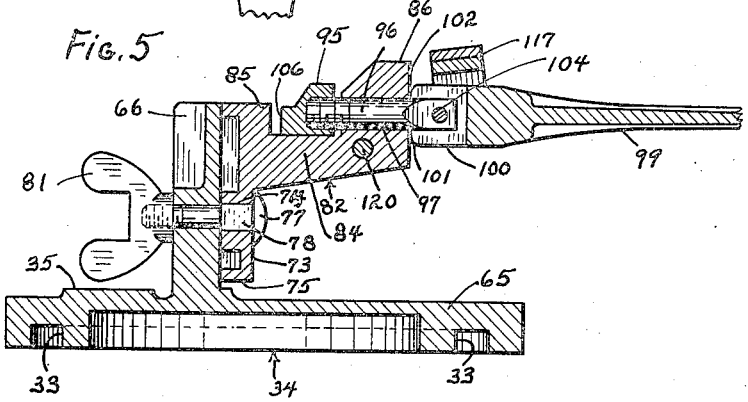

Jan. 18, 1949.  A. W. MALL  2,459,233
SAW SHARPENER
Filed Sept. 28, 1944  4 Sheets-Sheet 4
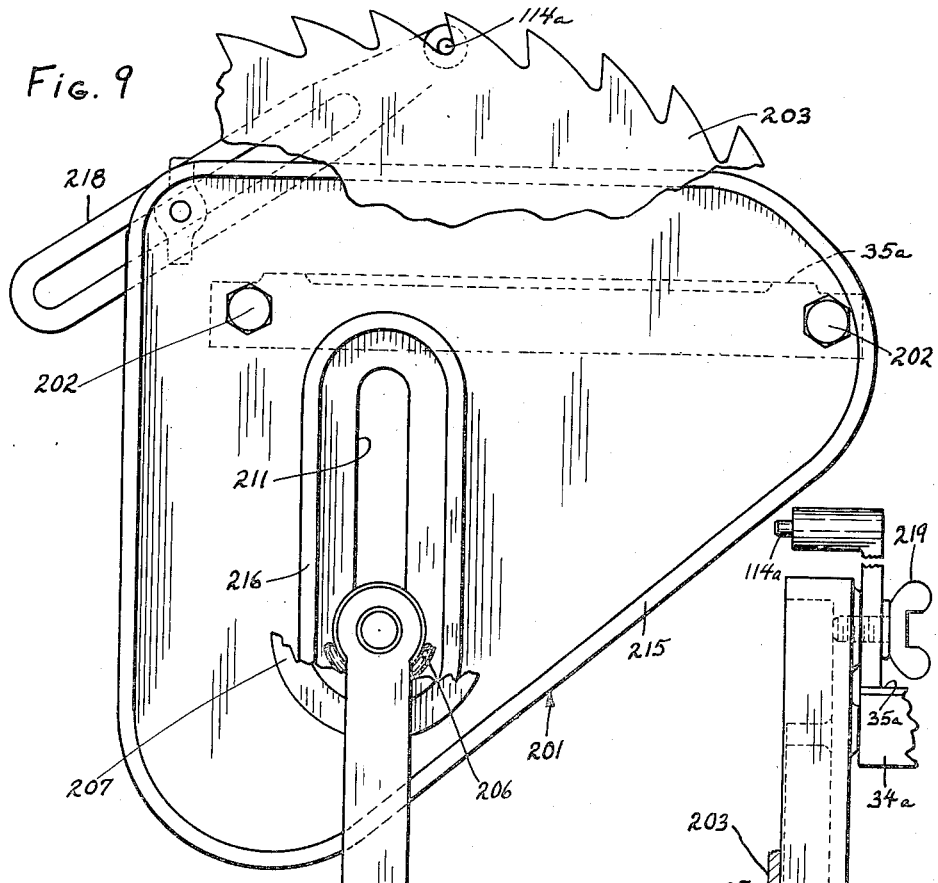
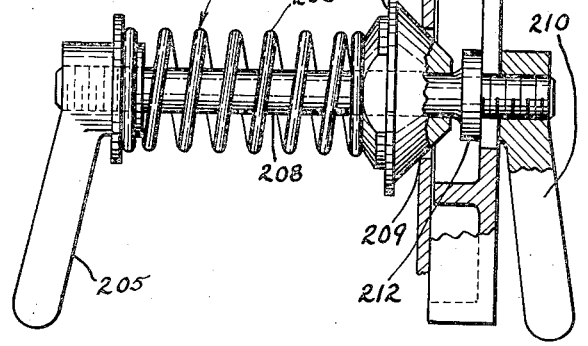
INVENTOR
Arthur W. Mall
BY Albert Latta
ATTORNEY Patented Jan. 18, 1949

2,459,233

UNITED STATES PATENT OFFICE 2,459,233

SAW SHARPENER

Arthur William Mall, Flossmoor, Ill., assignor to Mall Tool Company, Chicago, Ill., a corporation of Illinois Application September 28, 1944, Serial No. 556,231

18 Claims. (Cl. 51—98)

My invention relates to saw sharpening machines and has for its general objective, the provision of a sharpening machine which may be used for sharpening continuous link-toothed cutting chains and other types of saw blades.

My invention also has as its general objective, the provision of a new method for sharpening cutting chains and saw blades.

The specific objects and advantages of my saw sharpening machine and method will be hereinafter described in the specification and will become apparent upon examination of the drawings in which:

Fig. 1 is a side elevational view of my saw sharpening machine, parts of which are shown in section;

Fig. 2 is a plan view of the same machine, parts of which are shown in section;

Fig. 3 is a front detail view of the turntable device alone shown partly in section;

Fig. 4 is a plan view of the turntable device, parts of which are shown in section;

Fig. 5 is a sectional view of the turntable device taken on line 5—5 of Fig. 3;

Fig. 6 is an enlarged fragmentary detail view of the turntable device as shown in Fig. 3 illustrating the grinding operation;

Fig. 7 is a fragmentary detail view taken on line 7—7 of Fig. 6;

Fig. 8 is a detail view of the tooth locating lever;

Fig. 9 is a detail view of a modified form of my invention for sharpening circular saw blades; and Fig. 10 is a detail side view of the device shown in Fig. 9.

I have provided a main supporting casting 1, which may be secured by means of bolts 2 to any suitable bench or table, or if no table or bench is available then it may be secured to a tree or other vertical object by means of the leg members 3 which may be secured to casting 1 by any suitable means. Casting 1 is provided with a pair of vertically extending side walls 4 and 4a and a front wall 5. Casting 1 is provided with a pair of bosses 6 and 7, through which holes are drilled so as to receive rod 8. The side walls 4 and 4a are also provided with holes axially aligned with the holes in bosses 6 and 7 and rod 8 extends across the entire width of casting 1 protruding through each of the side walls.

The hole which extends through side wall 4a and boss 7 is threaded so as to receive the threaded end of rod 8. Rod 8 is therefore axially movable relative to casting 1, by turning handle 9.

A second casting 10 is provided with a bifurcated portion terminating with arms 11 and 12. Both arms 11 and 12 are pivotally mounted on rod 8. A collar 13 is rigidly secured to rod 8 by a pin 14 extending through said rod. A compression spring 15 is under tension at all times, thereby urging arm 12 away from collar 14. Arm 11 is thereby continually biased against collar 13. The position of casting 10 relative to casting 1 is thereby governed by the position of collar 13. The reason for this adjustment will be hereinafter described.

Casting 10 has an upwardly extending wall portion 17 and a downwardly depending wall portion 18 terminating in an outwardly extending base portion 19.

An adjustment screw 20 is threaded through the upper wall portion 17 and its free end is adapted to abut against the front wall 5 of casting 2. A lock nut 21 secures adjustment screw 20 in any predetermined position of adjustment. The function of adjustment screw 20 will be hereinafter pointed out.

A second adjustment screw 22 is threaded through the lower wall portion 18 and its free end abuts against wall 5. Lock nut 23 secures adjustment screw 22 in any predetermined position of adjustment. The function of screw 22 will be hereinafter explained.

A third screw 25 is located at the upper end of the upper wall portion 17. The head 26 of screw 25 is adapted to abut against wall 5. A collar 27 is threaded onto screw 25 and is locked in position by nut 28. Collar 27 has a threaded stem 29 which is loosely threaded into threaded bore 31 in wall portion 17 so as to be pivotal relative thereto. Pin 30 which is pressed into wall portion 17 limits the pivotal movement of screw stem 29 in the threaded bore 31 as a result of collar 27 abutting against pin 30. The function of screw 25 will be hereinafter explained.

The base portion 19 of casting 10 is provided with an arcuate rib 32 which mates with the arcuate groove 33 formed in turntable 34 whereby turntable 34 may be rotated relative to casting 10 about an axis common to the axis of turntable 34 and to the axis of arcuate rib 32. A second arcuate rib 35 is formed in the upper surface of turntable 34 and its axis is common to the axis of turntable 34.

A screw 36 extends through the base portion 19 and also through bosses 37 and 38 formed in said base portion. The threaded end of screw 36 is threaded into a clamp bar 40. One end of clamp bar 40 is loosely received in a slot 41 formed in wall portion 18 of casting 10 and the other end of said clamp bar flatly engages the upper surface of the arcuate rib 35. Thus, when it is desired to rotate turntable 34 relative to casting 10, screw 36 is turned to the left thereby releasing clamp bar 40. Turntable 34 is then rotated to the desired position of adjustment as indicated by the measurement indicator marks 43 and by locating mark 44. The turntable is then securely fastened in the selected predetermined position of adjustment by turning screw 36 to the right, thereby causing clamp bar 40 to become tightly biased against rib 35 against the opposing bias of base portion 19 against the underneath surface of turntable 34.

At the upper end of casting 1 are a pair of horizontally aligned bosses 46 and 47 which receive a pair of parallel rods 48 and 49 by pressed fit. At the outer ends of said rods is a bracket assembly 50 which is slidably mounted relative to rods 48 and 49. A spindle housing 51 is securely fastened to the bracket assembly 50 so as to be movable therewith. The grinding wheel 52 is rotatably supported by anti-friction bearings (not shown) located within the spindle housing. At the other end of the spindle housing is a pulley groove 53 which may be drivingly connected to a power unit (not shown) by means of belt 54.

A clamp bar 55 rests upon rods 48 and 49 and is removably connected to the bracket assembly 50 by means of bolt 56. When it is desired to adjust the grinding wheel 52 and bracket assembly 50 longitudinally relative to rods 48 and 49, bolt 56 is loosened and bracket assembly 50 may be manually moved longitudinally of rods 48 and 49. When the grinding wheel and bracket assembly are moved to the desired position of adjustment, then bolt 56 is re-tightened thereby causing clamp bar 55 to securely fasten said bracket assembly in its selected position of adjustment.

By using two parallel rods 48 and 49, I prevent any possibility of pivotal movement of bracket assembly 50 about the axis of rods 48 and 49, thereby assuring that grinding wheel 52 is always maintained in a true vertical plane.

A bracket 58 prevents bracket assembly 50 from sliding off the ends of rods 48 and 49 and maintains rods 48 and 49 in parallel relation to each other.

A counterbalancing tension spring 59 is suspended between rods 48 and 49 and base portion 19 by means of bolts 60 and 61. Bolt 60 is supported relative to rods 48 and 49 by bars 62 and 63 which extend transversely of said rods. Bolt 61 extends through base portion 19 of casting 10. The ends of spring 59 are secured to bolts 60 and 61 and said spring is always under tension so that casting 10 and turntable 34 and all of the parts carried by said casting and turntable normally swing about pivot 8 to an upward position in which screws 25 and 29 abut against wall 5 as shown in Fig. 1. When the weight of the chain 64 or saw or saw blade to be sharpened is added to turntable 34, then the tension of spring 59 is overcome and turntable 34 and its associated parts swing about pivot 8 to a downward position until screw 22 abuts against wall 5.

Turntable 34 is provided with a circular base 65 and an upwardly extending wall 66. Wall 66 is provided with two bosses 67 and 68. A pair of pins 69 and 70 are pressed into wall 66 through bosses 67 and 68. The heads 71 and 72 of pins 69 and 70 protrude outwardly from the wall 66 and form a bearing support for segment 73. Segment 73 is provided with an arcuate slot 74. The arcuate periphery 75 of segment 73 is generated from an axis which is common to the axis of slot 74. Likewise, an arcuate line drawn through the axes of pins 69 and 70 is generated from the same axis as periphery 75 and slot 74. A bolt 77 has a squared shoulder portion 78 which fits snugly enough in slot 74 so as to eliminate play, but loosely enough to allow segment 73 to be rotated relative to wall 66 within the limits of slot 74. When segment 73 is rotated the periphery 75 continually rides on the pin heads 71 and 72, thereby receiving bearing support therefrom. Segment 73 is provided with indicator marks 79 and pin head 71 has a locating mark 80 inscribed therein.

Bolt 77 is threaded at one end and receives internally threaded wing nut 81. Thus, when it is desired to rotate segment 73 relative to wall 66, wing nut 81 is turned to the left and when segment 73 has been rotated to desired position of adjustment, wing nut 81 is turned to the right thereby tightening segment 73 against wall 66.

Segment 73 forms one portion of a casting 82. Said casting has an outwardly and transversely extending bar 83. Said bar has a base portion 84 and a wall 85 extending upwardly at right angles to the base portion. The base portion 84 has an upwardly extending block 86 for supporting the saw chain clamping device.

Secured to base 84 by bolts 89 are a pair of bars 87 and 88 which conform to the surface contour of base 84 as best viewed in Fig. 3. Said bars 87 and 88 form a wall 90 (best viewed in Fig. 1) opposite wall 85. Walls 85 and 90 and base 84 form a groove in which the depending tongues 91 (see Fig. 6) of chain teeth 92 ride. The width of said groove may be varied by loosening bolts 89 and moving bars 87 and 88 inwardly or outwardly within the limits of slots 94.

The inner ends of bars 87 and 88 are spaced from each other so as to provide parallel walls within which clamping block 95 is free to slide back and forth. Block 95 is provided with a centrally located, internally threaded bore which receives the threaded end of screw member 96. Screw member 96 is slidably received in a central bore 97 extending through support block 86. The outer flattened end of screw member 96 is pivotally secured by pin 104 within the bifurcated end of handle 99. The inner end of each fork 100 is rounded at 101 to provide a bearing surface for riding against wall 102 of block 86. Bearing surface 101 serves as a cam when handle 99 is manually pushed downwardly, thereby causing screw member 96 and clamp block 95 to be retracted away from wall 85. Thus when chain 64 is positioned in groove 105 ready to be sharpened, wall 106 of clamp block 95 is urged against the depending tongue 91 of chain tooth 92 thereby anchoring it in position while it is being ground. When the succeeding tooth 107 is moved into position to be sharpened, it is anchored in position by clamp block 95 engaging the depending tongues 91 of two successive chain teeth 92.

Handle 99 is normally maintained in a downward position thereby causing clamp block 95 to be maintained in a retracted position. When it is desired to move clamp block 95 in chain clamping direction, handle 99 is moved upwardly to the position shown in Fig. 5. Compression springs 109, which are always under tension, cause clamp block 95 to be biased against the tongues 92 of the cutting chain. It will be noted that block 86 is provided with a pair of bores 110 which are axially aligned with a pair of bores 111 in clamp block 95. Compression springs 109 are mounted in said bores. It will be noted that clamp block 95 may be adjusted relative to screw 96, thereby varying the tension of springs 109. This adjustment is accomplished by rotating handle 99.

In order to assure that each tooth is located in the proper position before being anchored by clamp block 95, I have provided a locating finger 114. Said finger 114 is formed in a bar 115 which is secured to a cross piece 116 of bracket device 117. Said bracket 117 consists of a pair of axially aligned hubs 118 and 119 which embrace the block 86. A pin 120 extends through block 86 into hubs 118 and 119 so that bracket 117 may be pivotally swung around said pin 120. Said bracket 117 has a pair of arms 121 and 122 which merge with cross piece 116. Said bracket 117 also has an outwardly extending arm portion 123 the reason for which will presently appear. Said arm portion 123 extends inwardly to form a lip 124 which abuts the underneath surface of block 86. A torsion spring 125 is coiled about hub 118 and one end of said spring is secured to the underneath side of block 86 by means of a screw 127 shown in Fig. 3 and shown in dotted lines in Fig. 8. The other end of torsion spring 125 overlaps arm 121, thereby causing bracket 117 to be normally maintained in retracted position as shown best in Fig. 1. Bracket 117 is moved about pivot pin 120 into tooth locating position by applying manual pressure against the underneath side of arm portion 123.

Referring to Fig. 6, I have shown the different types of cutting teeth which make up cutting chain 64 and the three angular faces on each tooth. For purposes of clarification, I have designated these angular faces as the "face" angle, "hook" angle and "clearance" angle. The "face" angle is designated as 128, the "hook" angle as 129 and the "clearance" angle as 130. My sharpening machine is primarily intended for grinding only the "face" angle 128 and "hook" angle 129 as it is rarely necessary to grind the "clearance" angle 130. It is also to be noted that the "hook" angle and "face" angle are ground simultaneously in the manner hereinafter described.

Method of operation

When it is desired to sharpen a cutting chain such as is shown in Fig. 6, the method of procedure is as follows:

It will first be noted that cutting chain 64 is made up of inner link teeth 92, called "raker" teeth and outer link teeth 107 called "cutting" teeth and the sequence is made up of four different types of teeth, consequently every fourth tooth is identical in construction. Cutting chain 64 is first placed into the guide groove 105 (as best shown in Fig. 6). Then the grinding wheel 52 is adjusted longitudinally of rods 48 and 49 by loosening bolt 56 and manually moving bracket assembly 50 relative to rods 48 and 49. Then turntable 34 and casting 10 are swung as a unit about the axis of rod 8 and chain groove 105 approaches the bottom edge of grinding wheel 52 in an arcuate path (as determined from axis of rod 8) shown by arcuate line 150. The lowest point on the underneath edge of the grinding wheel 52 (which point is designated as 151) is then aligned with guide groove 105 viewing Fig. 1. Then bolt 56 is retightened, thereby securing grinding wheel 52 in a fixed position. It is to be noted that as the grinding wheel 52 wears down, it becomes reduced in diameter, thereby changing the aligned position of point 151 relative to chain guide groove 105. Consequently, it becomes necessary to occasionally re-adjust grinding wheel 52 longitudinally relative to rods 48 and 49 so as to re-align point 151 with guide groove 105.

The second step is to move handle 99 upwardly to the position shown best in Fig. 5, thereby causing clamp block 95 to anchor the cutting chain in a fixed position in guide groove 105.

The next step is to adjust segment 73 rotatively relative to the wall portion 66 of turntable 34. This is accomplished by loosening wing nut 81 and manually rotating segment 73 within the limits of slot 74. The indicator marks 79 when aligned with the indicator mark 80 on pin head 71 accurately determine the angular position of segment 73 relative to wall 66. Likewise rotation of segment 73 causes cutting chain 64 to assume the tilted position shown in Fig. 6 and the "hook" angle 129 of the cutting teeth assumes a vertical position in alignment with the vertical position of grinding wheel 52. Wing nut 81 is then retightened thereby securing segment 73 in a fixed position of adjustment relative to wall portion 66.

The next step is to rotatively adjust turntable 34 relative to casting 10 by loosening screw 36 and manually rotating said turntable. The indicator marks 43 on turntable 34 when aligned with the indicator mark 44 on casting 10 accurately determines the angular position of turntable 34 relative to casting 10, thereby adjusting the "face" angle 128 of the chain tooth so as to be flat against the side face of grinding wheel 52. When this is accomplished screw 36 is retightened thereby securing turntable 34 in a fixed position of rotative adjustment relative to casting 10.

The next step, then, is to manually swing bracket 117 about its pivot pin 120 (preferably by inserting a thumb or finger under arm portion 123) until locating finger 114 is inserted into one of the openings between the two cutting teeth (the opening referred to is the opening into which grinding wheel 52 is inserted as shown in Fig. 6). Cutting chain 64 is then manually moved through groove 105 until the outermost cutting tip 155 engages locating face 154 of locating finger 114. The manual pressure on bracket 117 is then released and torsion spring 125 causes bracket 117 and locating finger 114 to swing back into its retracted position as shown in Fig. 1. It is to be noted that locating face 154 of locating finger 114 is beveled off slightly so that finger 114 will not drag against cutting tip 115 during retracting movement of bracket 117.

The next step is to adjust turntable 34 and casting 10 laterally relative to casting 1 by rotating rod 8 by means of handle 9. This adjustment, as hereinbefore described, causes cutting chain 64 to be moved in a direction which is the same as the axial movement direction of rod 8 accomplished during rotation of rod 8. Cutting chain 64 is thereby adjusted in a laterial direction relative to grinding wheel 52 and the amount of metal to be ground off of each tooth is accurately determined by the rotation of rod 8. The amount of metal to be ground off of each tooth may be best adjusted by starting up grinding wheel 52 and thereupon rotating rod 8 simultaneously while grinding the tooth which is in grinding position.

The next step, then, is to loosen lock nut 21 and adjust screw 20 so that the free end of screw 20 abuts wall 5 at the moment when the bottom edge of grinding wheel 52 reaches the desired depth within the openings between the cutting portions of the chain teeth. The desired depth is shown in Fig. 6 wherein the point 151 of grinding wheel 52 just grazes the base 160 of the cutting teeth. It will be noted that as the grinding wheel 52 wears down and becomes reduced in diameter, screw 20 will have to be re-adjusted to permit turntable 34 to swing further upwardly about the axis of rod 8.

Adjustment screw 22 limits the downward movement of turntable 34 about the axis of rod 8 and serves to maintain the cutting chain in a position near the grinding wheel, so that turntable 34 will not have to be manually moved very far about the axis of rod 8 while sharpening the chain teeth.

After effecting the various adjustments set forth hereinbefore, the final step is the actual sharpening of the cutting chain which is preferably accomplished as follows: Cutting chain 64 is manually moved through groove 105 until (for example) tooth 170 approaches grinding position. Locating finger 114 is then inserted into the opening between the cutting edge of tooth 170 and the rear edge of tooth 171. The cutting chain is then manually moved forward until tip 155 of tooth 170 grazes face 154 of locating finger 114. Then handle 99 is moved upwardly to position shown in Fig. 5 and clamp block 95 is anchored against the depending tongue 91 of tooth 170. Locating finger 114 is then retracted and tooth 170 is sharpened. As previously pointed out, counter-balancing spring 59 facilitates manual movement of turntable 34 about axis of rod 8 for bringing tooth 170 into the grinding wheel. When tooth 170 is sharpened, the manual pressure on turntable 34 is released and tooth 170 moves away from the grinding wheel. Handle 99 is then pulled downwardly, thereby retracting clamp block 95. Chain 64 is then moved forwardly again until the fourth succeeding tooth reaches grinding position and the sharpening operation is repeated as set forth above. It is to be noted that the cutting chain which I have shown in Fig. 6 is made up of four different types of cutting teeth, as previously described, therefore, each fourth tooth is identical in construction. Consequently, I prefer to grind the cutting chain shown in Fig. 6 by grinding each fourth tooth until I reach the end of the chain. Then, in order to sharpen tooth 171 (and each fourth successive tooth thereafter) it is necessary to loosen screw 36 and re-adjust turntable 34 rotatively relative to casting 10 so that the "face" angle 128 of tooth 171 will be flat against the side face of grinding wheel 52. Thus it can be seen that it will be necessary to adjust turntable 34 rotatively relative to casting 10 four times in order to grind all of the teeth of cutting chain 64. It can be seen that if cutting chain 64 were made up of teeth all of which had the same "face" angles 128, then turntable 34 would only have to be rotatively adjusted once for sharpening all of the teeth of the entire chain and I do not wish to be limited to a process of sharpening a cutting chain made up of teeth having four different face angles, as shown in Fig. 6.

Referring to Figs. 9 and 10 I have shown a modified form of my invention in which circular saw blades may be sharpened as readily as link-toothed cutting chains. The turntable 34a is in the form of a segment and has arcuate rib 35a, shown in dotted lines in Fig. 9. The segment 34a is securely fastened relative to casting 10 by means of clamp bar 40 in the manner hereinbefore described. Segment 34a is likewise rotatively adjustable relative to casting 10 in the same manner as hereinbefore described.

Secured to the end face of segment 34a by means of bolts 202 is a downwardly depending casting 201. A circular saw blade 203, a part only of which is shown in Fig. 9, is supported against the casting 10 by means of the clamping assemblage 204.

The saw blade 203 is provided with a central hole (not shown) which may be circular or other shape. The saw blade 203 is mounted relative to casting 201 by removing thumb screw 205 and manually removing spring 206 and collar 209. The saw blade 203 is then inserted onto bolt member 208. The collar 207, spring 206 and thumb screw 205 are then reassembled onto bolt 208 as shown in Fig. 10. Collar 207 has a conical piloting surface 209 which is received in the central opening in the saw blade and locates said blade in a fixed axial position relative to casting 201. When it is desired to sharpen saw blades of various diameters, thumb screw 210 may be loosened and bolt member 208 may be moved up and down within the limits of slot 211. Screw 210 is then retightened and annular shoulder 212 on bolt member 208 abuts the wall of casting 201 on either side of slot 211 and bolt 208 is firmly secured in a fixed position relative to casting 201.

Collar 207 is slidably mounted on bolt member 208 and saw blade 203 is biased against casting 201 by means of compression spring 206 which is always under tension. It will be noted that casting 201 has a rib 215 extending about its entire periphery permitting ample bearing surface for the face of the saw blade to rest against. A second rib 216 provides a bearing surface for the central region of the saw blade. It will be noted, however, that rib 216 is shallower in depth than rib 215, consequently, the face of the saw blade is biased more firmly against rib 215 than against rib 216 thereby assuring that the saw blade will not "quiver" or "chatter" during the sharpening of the teeth thereof.

In order to locate each tooth of the saw blade prior to the sharpening thereof, I have provided locating finger 114a which is secured to a slotted guide bar 218. Locating finger 114a is adjustable relative to casting 201 by loosening wing nut 219. When wing nut 219 is retightened, locating finger 114a is anchored in a fixed position. When one tooth is sharpened, saw blade 203 is manually retracted axially of bolt 208 against the tension of spring 206, then rotated until the next tooth to be sharpened is in approximate position (as determined by locating finger 114a) then the saw blade is released and permitted to move axially of bolt 208 until it is again biased against rib 215. Then blade 203 is further rotated slightly, until finger 114a "bottoms" at the base of the saw tooth as shown in Fig. 9. The sharpening operation is then performed in the same manner as in sharpening a link-toothed cutting chain.

Having thus described my invention, what I claim is:

1. A device for sharpening saw teeth comprising a support member having an upright portion, a pair of parallel rods secured to the upper end of the upright and extending outwardly therefrom, a grinding wheel suspended from said rods and removably secured thereto so as to be longitudinally adjustable of said rods, a bracket member pivotally mounted relative to the upright whereby to be moved toward and away from the grinding wheel, a turntable rotatively adjustable relative to the bracket member and supported thereby, adjustable means secured to the bracket member and cooperating with the support member for limiting the upward movement of the bracket member relative to the support member, a rod adjustably mounted on the support member, said bracket member being pivotally mounted on said rod and movable therewith in an axial direction whereby to adjust the position of the saw teeth relative to the grinding wheel and said saw teeth being positioned on the turntable and being sharpened by manual movement of the turntable and bracket member toward the grinding wheel.

2. A device for sharpening saw teeth comprising a support member having an upright portion, a pair of parallel rods secured to the upper end of the upright and extending outwardly therefrom, a grinding wheel suspended from said rods and removably secured thereto so as to be longitudinally adjustable of said rods, a bracket member pivotally mounted relative to the upright whereby to be moved toward and away from the grinding wheel, a turntable rotatively adjustable relative to the bracket member and supported thereby, adjustable means secured to the bracket member and cooperating with the support member for limiting the upward movement of the bracket member relative to the support member, a second adjustment means secured to the bracket member and cooperating with the support member for limiting the downward movement of the bracket member relative to the support member, said saw teeth being positioned on the turntable and being sharpened by manual movement of the turntable and bracket member toward the grinding wheel.

3. A device for sharpening saw teeth comprising a support member, a grinding wheel carried thereby, a bracket member carried by the support member and movable relative thereto in a direction upwardly and downwardly relative to the grinding wheel, said bracket member also being movable in a rectilinear direction from side to side relative to the grinding wheel, a turntable carried by the bracket member and rotatively adjustable relative thereto, a wall extending upwardly from the turntable, a carrying member secured to the wall and rotatively adjustable relative thereto and means associated with the carrying member for temporarily anchoring the saw tooth to be sharpened.

4. A device as described by claim 3 wherein a finger member is pivotally mounted on the carrying member, whereby to locate the saw tooth to be sharpened before said tooth is temporarily anchored.

5. A device as described by claim 3 wherein the means for temporarily anchoring the saw tooth to be sharpened includes a block, a spring normally urging said block in tooth anchoring direction, and a handle having connection with the block for retracting said block away from said saw tooth.

6. A device for sharpening saw teeth as described in claim 3 wherein a finger member is movably secured to the carrying member, whereby to locate the saw tooth to be sharpened before said tooth is temporarily anchored and a spring associated with said finger member for retracting same after the saw tooth is located.

7. A device as described by claim 3 wherein a pair of bars are mounted on the carrying member in spaced relation, said tooth anchoring means being movable within the space between said bars and being guided thereby.

8. A saw tooth sharpening device comprising a frame member having an upright wall, a pivot rod extending through the upright wall and axially adjustable relative thereto, a second frame member pivotally mounted on said pivot rod, an adjustable stop member secured to the second frame member and adapted to engage the upright wall whereby to limit the upward travel of the second frame member, a pair of parallel rods secured to the upper end of the upright wall and extending outwardly therefrom, a grinding wheel removably secured to the parallel rods and adjustable axially of said rods, a turntable rotatably supported on the second frame member whereby angular adjustment of the turntable relative to the grinding wheel is obtained, means carried by the turntable for supporting the saw teeth to be sharpened and means for locating the saw teeth relative to the grinding wheel preparatory to the sharpening thereof.

9. A saw tooth sharpening device as set forth in claim 8 wherein a counterbalancing spring extends between the second frame member and the parallel rods.

10. A tooth-anchoring device for a sharpening machine comprising a support block, an upwardly extending wall on the support block, a pair of bars spaced from each other and adjustably secured to the support block, said bars being normally in longitudinal alignment with each other and one of the side faces of each bar being opposed to and spaced from the wall on the support block whereby to form a channel, a movable block mounted in the space defined between the ends of the bars, means carried by the support block for moving the movable block toward and away from the wall on the support block, whereby to anchor a cutting chain against the wall on the support block.

11. A tooth-anchoring device for a sharpening machine as defined by claim 10 wherein yieldable means are associated with the movable block for normally urging said movable block in chain anchoring direction.

12. A tooth-anchoring device for a sharpening machine as defined by claim 10 wherein a lever is adjustably connected to the movable block for retracting the movable block away from the wall on the support block and for maintaining the movable block in retracted position.

13. A tooth-anchoring device for a sharpening machine comprising, a support member for supporting a cutting chain to be sharpened, a movable block carried by the support member and adapted to engage the cutting chain for temporarily anchoring said chain relative to the support member, an upwardly extending wall portion on said support member, a rod extending through said wall portion and having screw-threaded engagement with the movable block, a lever pivotally secured to the outer end of the rod, said lever having one end in engagement with the wall portion of the support member, yieldable means extending between the movable block and wall portion for normally urging the movable block in chain clamping direction, and said lever being adapted for retracting the movable block away from the cutting chain.

14. A tooth-locating device for a sharpening machine comprising, a support member for supporting a cutting chain, said support member having an outwardly extending portion, a pivot rod journaled through said outwardly extending portion, a bracket having a pair of arms embracing the outwardly extending portion, each arm being mounted on the pivot rod, said bracket member having a body portion extending between the arms, a finger extending outwardly from the body portion and adapted to engage a tooth of the cutting chain upon rotation of the bracket member about the pivot rod, and yieldable means associated with the support member and bracket member for normally urging the bracket member away from the cutting chain.

15. A tooth-locating device as described in claim 14 wherein the tooth engaging face of the finger is angularly inclined, whereby to facilitate retraction of the finger away from contact with the tooth.

16. In a device for sharpening link-toothed cutting chains and having a primary supporting member, a chain supporting assemblage comprised of an L-shaped bracket, a pair of spaced arms protruding outwardly from one wall of the bracket, said arms having connection with the primary supporting member so as to be adjustable pivotally relative to said primary supporting member and also adjustable laterally relative to said primary supporting member, resilient counterbalancing means extending between the primary supporting member and the second wall of the L-shaped bracket, a turntable rotatively carried by the second wall of the L-shaped bracket and means carried by the L-shaped bracket for releasably securing the turntable to the second wall of the L-shaped bracket.

17. A sharpening device as described in claim 16 wherein a pair of adjustable stop members are secured to a wall of the L-shaped bracket for contacting the primary support member, thereby limiting the extent of the pivotal movement of the L-shaped bracket relative to the primary support member.

18. A device for sharpening saw teeth comprising an upright support, a horizontal support mounted adjacent to the upper end of the upright support, a grinding wheel suspended from the horizontal support and movable longitudinally along the horizontal support, the grinding wheel being removable from the horizontal support, a bracket member pivotally mounted relative to the upright whereby to be moved toward and away from the grinding wheel, a turntable rotatively adjustable relative to the bracket member and supported thereby, adjustable means secured to the bracket member and cooperating with the support member for limiting the upward movement of the bracket member relative to the support member, a rod adjustably mounted on the support member, said bracket member being pivotally mounted on said rod and movable therewith in an axial direction whereby to adjust the position of the saw teeth relative to the grinding wheel and said saw teeth being positioned on the turntable and being sharpened by manual movement of the turntable and bracket member toward the grinding wheel.

ARTHUR WILLIAM MALL.

REFERENCES CITED

The following references are of record in the file of this patent:

UNITED STATES PATENTS

| Number | Name | Date |
| --- | --- | --- |
| 338,187 | Rogers | Mar. 30, 1886 |
| 381,775 | Halladay | Apr. 24, 1888 |
| 437,929 | King | Oct. 7, 1890 |
| 831,693 | Wismar | Sept. 25, 1906 |
| 1,377,884 | Heryngfel et al. | May 10, 1921 |
| 1,853,245 | Wardwell | Apr. 12, 1932 |
| 1,909,832 | Jirka | May 16, 1933 |
| 1,966,364 | Thrasher | July 10, 1934 |
| 2,115,712 | Gavin | May 3, 1938 |
| 2,156,034 | Thomas | Apr. 25, 1939 |
| 2,217,145 | Stihl | Oct. 8, 1940 |
| 2,318,456 | Blum | May 4, 1943 |

FOREIGN PATENTS

| Number | Country | Date |
| --- | --- | --- |
| 21,655 | Great Britain | Sept. 25, 1913 |
| 218,430 | Switzerland | Apr. 1, 1942 |
| 670,747 | Germany | Jan. 26, 1939 |

OTHER REFERENCES

A Treatise on Tool Room Grinding, copyright 1937, by The Carborundum Co., Niagara Falls, New York.